May 8, 1956 W. G. GIBSON 2,744,951

REGISTRATION IN COLOR TELEVISION

Filed Aug. 1, 1952 2 Sheets-Sheet 1

INVENTOR.

WALTER G. GIBSON

BY [signature]

ATTORNEY

INVENTOR.
WALTER G. GIBSON
BY
[signature]
ATTORNEY

United States Patent Office 2,744,951

Patented May 8, 1956

2,744,951

REGISTRATION IN COLOR TELEVISION

Walter G. Gibson, Princeton, N. J., assignor to Radio Corporation of America, a corporation of Delaware Application August 1, 1952, Serial No. 302,052

The terminal 15 years of the term of the patent to be granted has been disclaimed 7 Claims. (Cl. 178—5.4)

This invention relates to registration in color television and more particularly to registration of corners in simultaneous color television.

It is generally accepted that the transmission of images in substantially their natural color requires that the image to be transmitted be divided, not only into its image elements, but into selected component color images.

Good results have been obtained by employing separate channels to transmit the separate component color image representative signals in the system popularly known as the "simultaneous" type system. However, in this system there is a registration problem at the transmitting end and at the receiving end of the system. The division of the image to be transmitted into selected component color images, generally, red, green, and blue, may be conveniently accomplished by using dichroic reflectors in a manner well known in the art to separate the component color images and then to apply each component color image to a separate pick-up tube. But, corresponding points in each of the component color images must be properly registered in order to provide an accurate reproduction of the original image.

At the transmitting end of the color television system there are three main places where the red, green, and blue separations can become misregistered in a three pick-up tube color camera, such as the three image orthicon color camera. The first place is in the optical paths. If the light paths differ in length, or if any of the various mirrors or reflectors are not at the proper angle, or if the lenses are positioned improperly, the images will be out of register on the faces of the image orthicons. These optical errors are, in general, so much smaller than the electrical errors that they are not serious except for parallax. However, once the optical system is set up and adjusted mechanically it remains in position and no longer causes misregistration.

The second and third places for misregistry occur in the image orthicons themselves. The light image on the photocathode emits photo electrons which set up an electron charge on the target corresponding to the original image. This region of the image orthicon is called the image section. The electron distributions on the target of the three image orthicons should, ideally, be in register. This is a source of misregistration that has been very hard to correct. This type of misregistration may be caused if the photo-electron image is rotated slightly in transit, which in itself is not serious since it can be compensated for by rotating the deflection coils; also, parts of the image may be rotated more than others, which is very difficult to correct; and the electron image is demagnified by following the magnetic lines of flux in the fringe field of the focus coil and, being a fringe-field, there are discrepancies between the fringe fields of the three image orthicons.

The third place for misregistry occurs in the deflecting beams. Unless corrected they do not, in general, scan corresponding parts of the target at the same time.

With a very few exceptions, all registry controls in the past have operated on the deflection beam. The exceptions include only normal operating controls for image orthicons. The registration adjustments in the color camera are: horizontal size, centering and linearity; vertical size, centering and linearity; skew; picture rotation; and, a few of the normal image orthicon controls which effect registration, such as the "s" distortion control and edge focus.

By means of these controls the main or central portion of the picture is usually registered satisfactorily but the edges and corners leave much to be desired.

It is, therefore, an object of this invention to provide means for properly registering the corners of the images to be transmitted in color television.

It is a further object of this invention to provide means for properly registering the corners of the images in the three pick-up tube color camera.

It is an aim of this invention to provide more accurate transmission of color images.

In accordance with the invention, by placing coils, which carry current to set up a magnetic field, around the periphery of the image section of an image orthicon, I have been able to compensate for corner errors. Eight coils are used, two for each corner, one of which is used for horizontal correction in each corner and one for vertical correction.

This invention will, however, be better understood from the following description when considered in connection with the accompanying drawing, and its scope will be pointed out in the appended claims.

Referring to the drawing.

Figures 1, 2, 3:
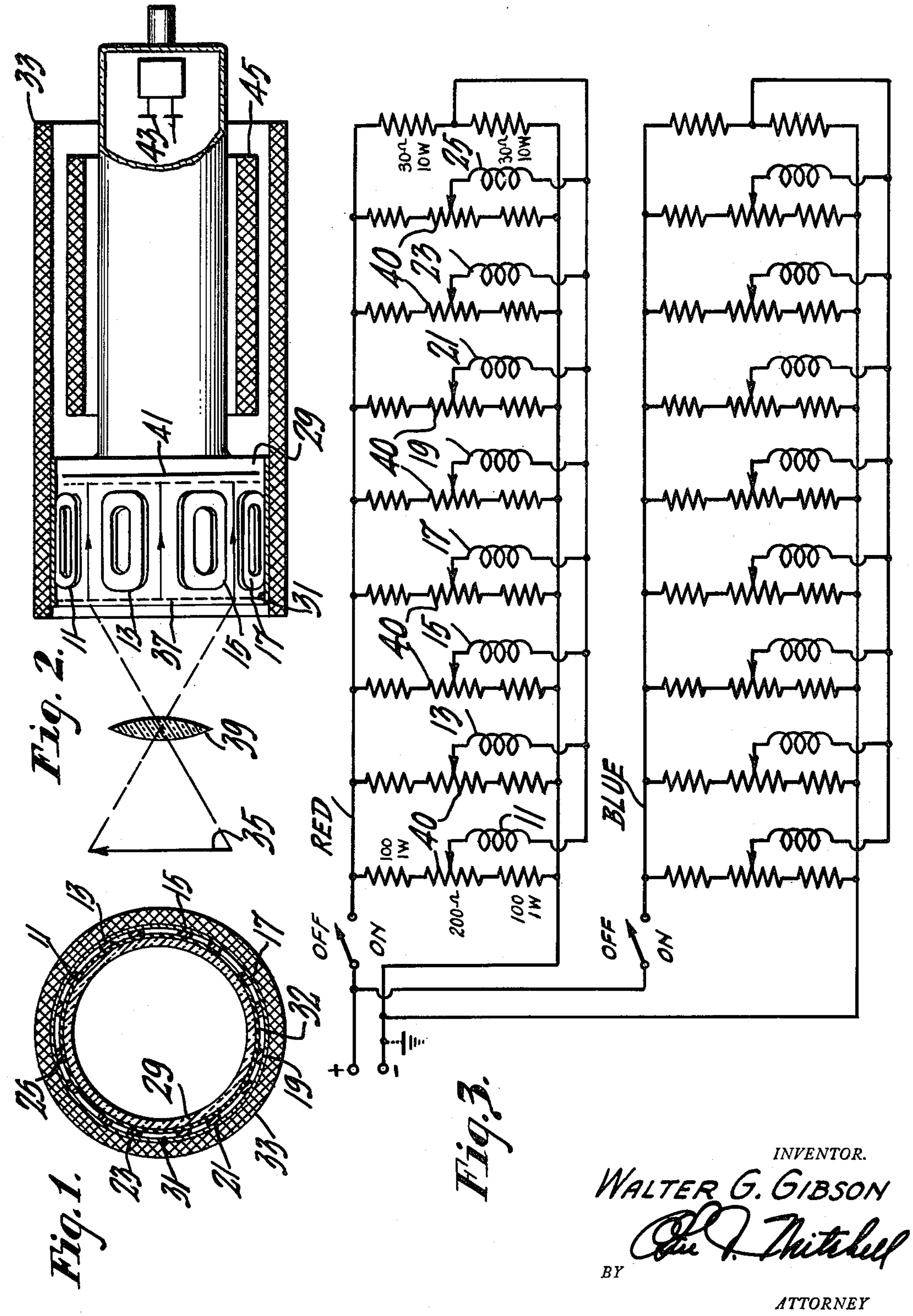
Fig. 1 illustrates a vertical sectional view taken along line 1—1 of Fig. 2 of an image orthicon wtih oval shaped auxiliary coils placed around the periphery of the image orthicon in accordance with my invention.
Fig. 2 illustrates a side view of an image orthicon with oval shaped auxiliary coils placed around the periphery of the image orthicon in accordance with my invention.
Fig. 3 is a schematic diagram showing the electric circuit used to energize the auxiliary coils in my invention.

Referring to Fig. 1 in more detail, eight coils 11, 13, 15, 17, 19, 21, 23, and 25 are shown placed around the periphery of the image section of, say, a red image orthicon 29 between the focus coil 33 and the image orthicon 29. In one form of this invention these coils are oval or elliptical in shape. These coils are supported around the image orthicon 29 by an aluminum support 31 and they are protected from the image orthicon 29 by fish paper or other suitable material 32.

In Fig. 2, a television scene 35 is seen projected onto the photocathode 37 of the image orthicon 29 by lens 39. Light striking the photocathode 37 causes an emission of an amount of photo-electrons from the photocathode 37 which is dependent on the amount of light striking the photocathode 37. These photoelectrons travel from the photocathode 37 to the target 41 of the image orthicon 29 where they set up an electron charge on the target 41 corresponding to the original image. The target 41 is then scanned by a beam of electrons which originate in the electron gun 43 and which are deflected in the usual manner by deflecting coil 45.

Fig. 3 is a schematic diagram showing an electric circuit which may be used to control the amount of current in the oval auxiliary coils. A 24 volt D.-C. supply provides a voltage across the potentiometer 40 of each oval coil. The position of the movable arm of each potentiometer controls the amount of current in each oval coil.

In the various figures in the drawing like parts have like numerals.

Figure 4:
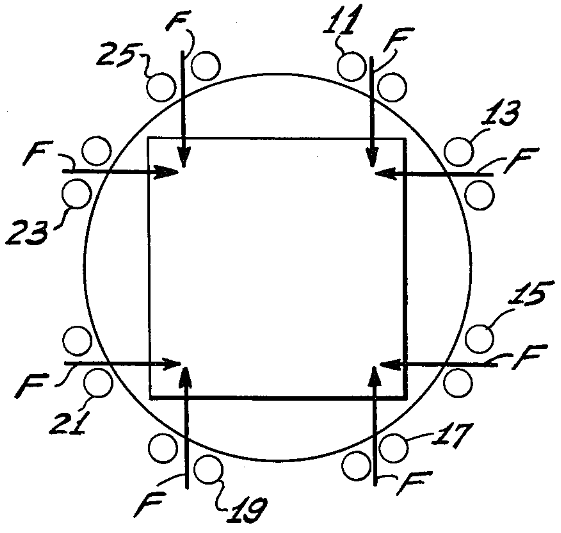
Fig. 4 illustrates diagrammatically the front end of the image orthicon of Figures 1 and 2, showing the magnetic fields produced by the coils associated therewith.

In one form of this invention, eight oval coils are placed around the periphery of the image section of only the red and the blue image orthicons of the camera. Each corner of the target of each of these image orthicons has two coils associated with it: one for changing the vertical distribution of the photo-electrons in the image section of the image orthicon in the vicinity of the corner, for example, coil 11, and one for changing the horizontal distribution, for example, coil 13. Figure 4 indicates by the arrows "F" the net deflecting fields of the several coils, respectively. As will be understood, each such field "F" will produce deflection or electrons passing through it in a direction substantially normal thereto. Passing a D.-C. current through any one of the coils sets up a magnetic field in the image section which deflects the electrons as they travel from the photo-cathode to the target of the image orthicon. The oval or elliptically shaped coils are positioned around the periphery of the image orthicon so that the major axis of each coil is parallel to the longitudinal axis of the image orthicon. Positioning the oval coils in this manner permits the magnetic field set up by the current in the oval coils to act on the photo-electrons for a longer period of time. Furthermore, since the magnetic field decreases with distance from the coil, the electrons nearer the coil are affected more than the others. The camera is first registered in the normal or usual way and then the currents in the corner coils are adjusted as explained to bring the corners into register.

From the foregoing description it can be seen that I have provided simple means for properly registering the corners of the images in a color television camera.

Having described my invention, what I claim is:

1. Electron controlling apparatus for an image orthicon including an image section having at opposite ends a photocathode and a target, respectively, said apparatus comprising, a plurality of pairs of electrically independent coils positioned about the periphery of said image section, one pair for each corner of such target and means to energize said coils substantially statically in a manner to control the shape of the impingement pattern upon said target of electrons derived from said photocathode, said coils being located with respect to said target such that one coil of each pair is arranged to control vertical deflection of electrons in its location and the other coil of the pair is arranged to control horizontal deflection of such electrons.

2. Electron beam control apparatus as in claim 1 wherein said energizing means are provided to individually energize said coils whereby to effect control of selected areas of said pattern.

3. Electron beam control apparatus as in claim 2 wherein said coils have a dimension which extends longitudinally of said image section for a substantial distance whereby greater control may be achieved.

4. Electron beam control apparatus as in claim 3 wherein said coils have substantially oval shapes with the major axes lying longitudinally of said image section.

5. Electron beam control apparatus as in claim 4 wherein said coils are uniformly spaced about the periphery of said image section.

6. In a color television camera utilizing three image orthicons each image orthicon including an image section having at opposite ends thereof a photocathode and a target, respectively, electron path control apparatus for two of said image orthicons, said apparatus for each of said two image orthicons comprising, a plurality of pairs of substantially oval shaped coils with the major axes lying longitudinally of said image section uniformly spaced about the periphery of said image section, one pair located at each corner of such target with the coils of that pair being disposed such that one coil controls vertical deflection of electrons in its region and the other coil controls horizontal deflection of electrons in that region, and means to individually energize said oval shaped coils substantially statically in a manner to control the shape of the impingement pattern upon said target of electrons derived from said photocathode.

7. In a color television apparatus, the combination comprsing: first, second and third television image scanning tubes, each having at opposite ends thereof a target and an electron gun for directing a beam of electrons toward said target; deflection means associated with said tubes for causing said electron beams to scan rectangular rasters on their respective targets for the derivation of image signals; and electron path controlling apparatus for at least two of said tubes, each such controlling apparatus comprising a plurality of electrically independent electromagnetic coils positioned about the periphery of its tube in the region of its target and means for energizing each of said coils to cause said coils to produce magnetic fields in the region of said target and effective at the corners of such rasters for controlling the path of electrons traveling toward it, each such controlling apparatus including a pair of such coils for each corner of such raster, one coil of the pair being located to effect vertical deflection of electrons at its corner and the other coil of the pair being located to effect horizontal deflection of such electrons.

References Cited in the file of this patent

UNITED STATES PATENTS

| | | |
|---|---|---|
| 2,244,748 | Walker | June 10, 1941 |
| 2,513,221 | Webb | June 27, 1950 |
| 2,587,830 | Freeman | Mar. 4, 1952 |
| 2,632,864 | Hunter | Mar. 24, 1953 |

FOREIGN PATENTS

| | | |
|---|---|---|
| 628,745 | Great Britain | Sept. 5, 1949 |